United States Patent
Anttalainen et al.

(10) Patent No.: US 10,057,826 B2
(45) Date of Patent: *Aug. 21, 2018

(54) METHOD OF CONTROLLING A COMMUNICATION CONTROL ENTITY

(71) Applicant: TELEFONAKTIEBOLAGET L M ERICSSON (PUBL), Stockholm (SE)

(72) Inventors: Santeri Anttalainen, Helsinki (FI); László Balla, Pomáz (HU); Arpad György, Budapest (HU)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 67 days.

This patent is subject to a terminal disclaimer.

(21) Appl. No.: 14/828,976

(22) Filed: Aug. 18, 2015

(65) Prior Publication Data

US 2015/0358880 A1    Dec. 10, 2015

Related U.S. Application Data

(63) Continuation of application No. 10/595,140, filed as application No. PCT/EP03/09816 on Sep. 4, 2003, now Pat. No. 9,173,143.

(51) Int. Cl.
*H04L 1/00* (2006.01)
*H04W 36/14* (2009.01)
(Continued)

(52) U.S. Cl.
CPC ........... *H04W 36/14* (2013.01); *H04W 36/10* (2013.01); *H04W 36/08* (2013.01)

(58) Field of Classification Search
CPC ....... H04W 8/26; H04W 84/12; H04W 88/06; H04W 92/02; H04W 92/24; H04W 8/04;
(Continued)

(56) References Cited

U.S. PATENT DOCUMENTS

| 6,091,953 | A | * | 7/2000 | Ho | ........................ | H04W 28/08 |
|---|---|---|---|---|---|---|
| | | | | | | 455/433 |
| 6,097,951 | A | * | 8/2000 | Ernam | .................. | H04W 28/08 |
| | | | | | | 455/433 |
| 6,505,050 | B1 | | 1/2003 | Brudos et al. | | |

FOREIGN PATENT DOCUMENTS

WO    2002035879 A1    5/2002

OTHER PUBLICATIONS

3GPP TS 23.236 V5.2.0; 3rd Generation Partnership Project; Technical Specification Group Services and System Aspects; Intra-domain connection of Radio Access Network (RAN) nodes to multiple Core Network (CN) nodes (Release 5); Mar. 2002, 35 pages.

(Continued)

*Primary Examiner* — Dady Chery
(74) *Attorney, Agent, or Firm* — Sage Patent Group

(57) ABSTRACT

A method of controlling a communication control entity in a mobile communication network and a corresponding communication control entity are described. The communication control entity is a part of a pool of communication control entities. In accordance of the invention, when acting as a primary communication control entity and receiving a request for adding a new secondary communication control entity to the overall control procedure, the communication control entity of the invention is arranged to determine whether the requested new secondary communication control entity is a part of the pool or not. If it is a part of the pool, then the primary communication control entity established a direct connection to the access part. The requested communication control entity is not added to the control procedure as a relay.

8 Claims, 3 Drawing Sheets

(51) Int. Cl.
*H04W 36/10* (2009.01)
*H04W 36/08* (2009.01)

(58) Field of Classification Search
CPC ........... H04W 8/06; H04W 8/12; H04W 8/18;
H04W 88/14; H04W 88/12; H04W 76/02;
H04W 88/181; H04J 2203/0019; H04L
12/18; H04L 12/184
USPC ........ 370/354, 312, 331, 338, 390; 455/433,
455/560, 432
See application file for complete search history.

(56) References Cited

OTHER PUBLICATIONS

3GPP TS 23.009 V4.0.0; 3rd Generation Partnership Project; Technical Specification Group Core Network; Handover procedures (Release 4); Mar. 2001, 265 pages.
3GPP TS 25.413 V4.3.0; 3rd Generation Partnership Project; Technical Specification Group Radio Access Network; UTRAN lu interface RANAP signalling (Release 4); Dec. 2001, 216 pages.
3GPP TS 29.002 V5.1.0; 3rd Generation Partnership Project; Technical Specification Group Core Network; Mobile Application Part (MAP) specification; (Release 5); Mar. 2002; pp. 390-631.
3GPP TS 48.008 V4.5.0; 3rd Generation Partnership Project; Technical Specification Group GSM EDGE Radio Access Network; Mobile-services Switching Centre—Base Station System (MSC—BSS) interface; Layer 3 specification (Release 4); Sep. 2001, 138 pages.

\* cited by examiner

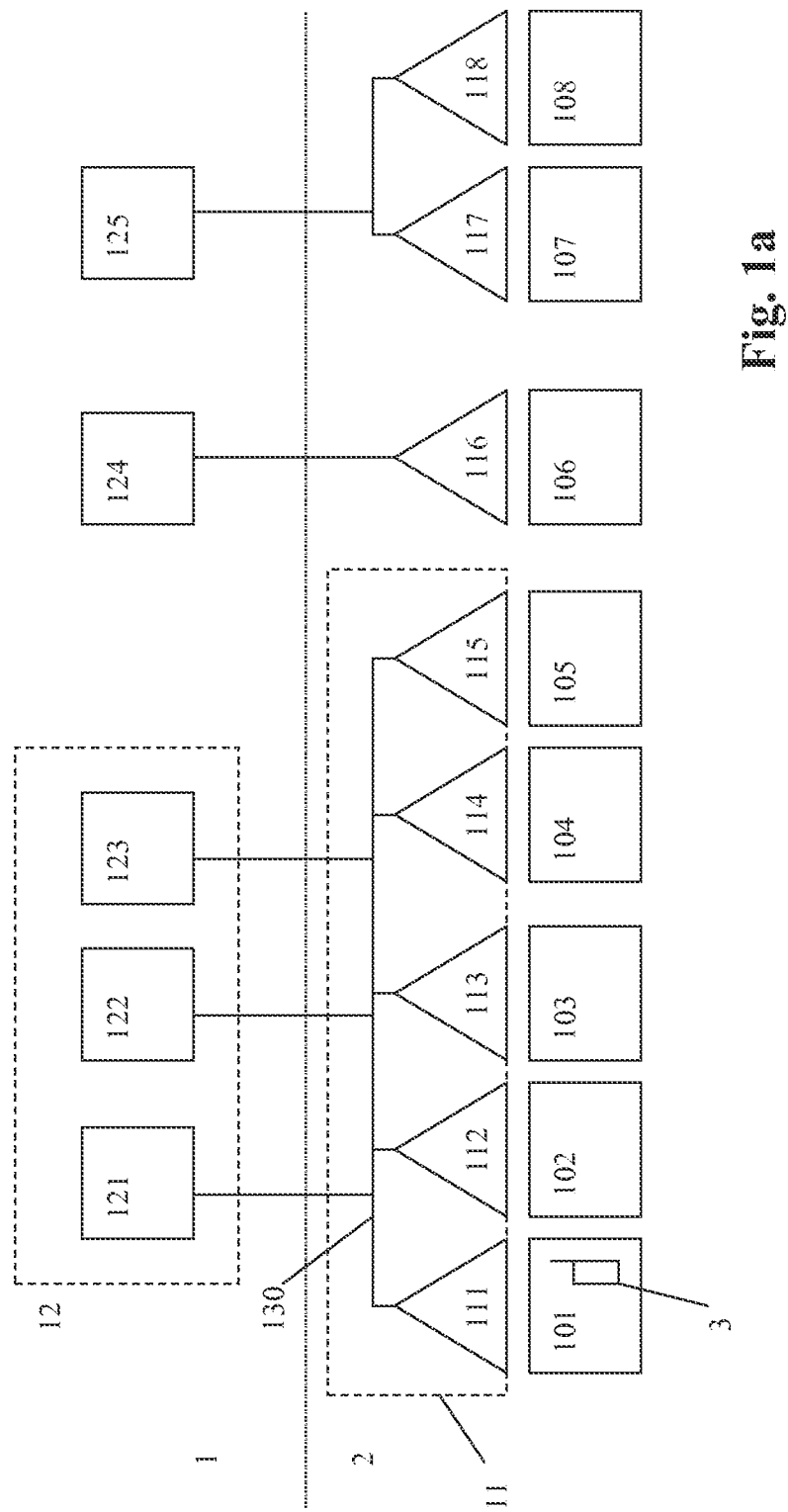

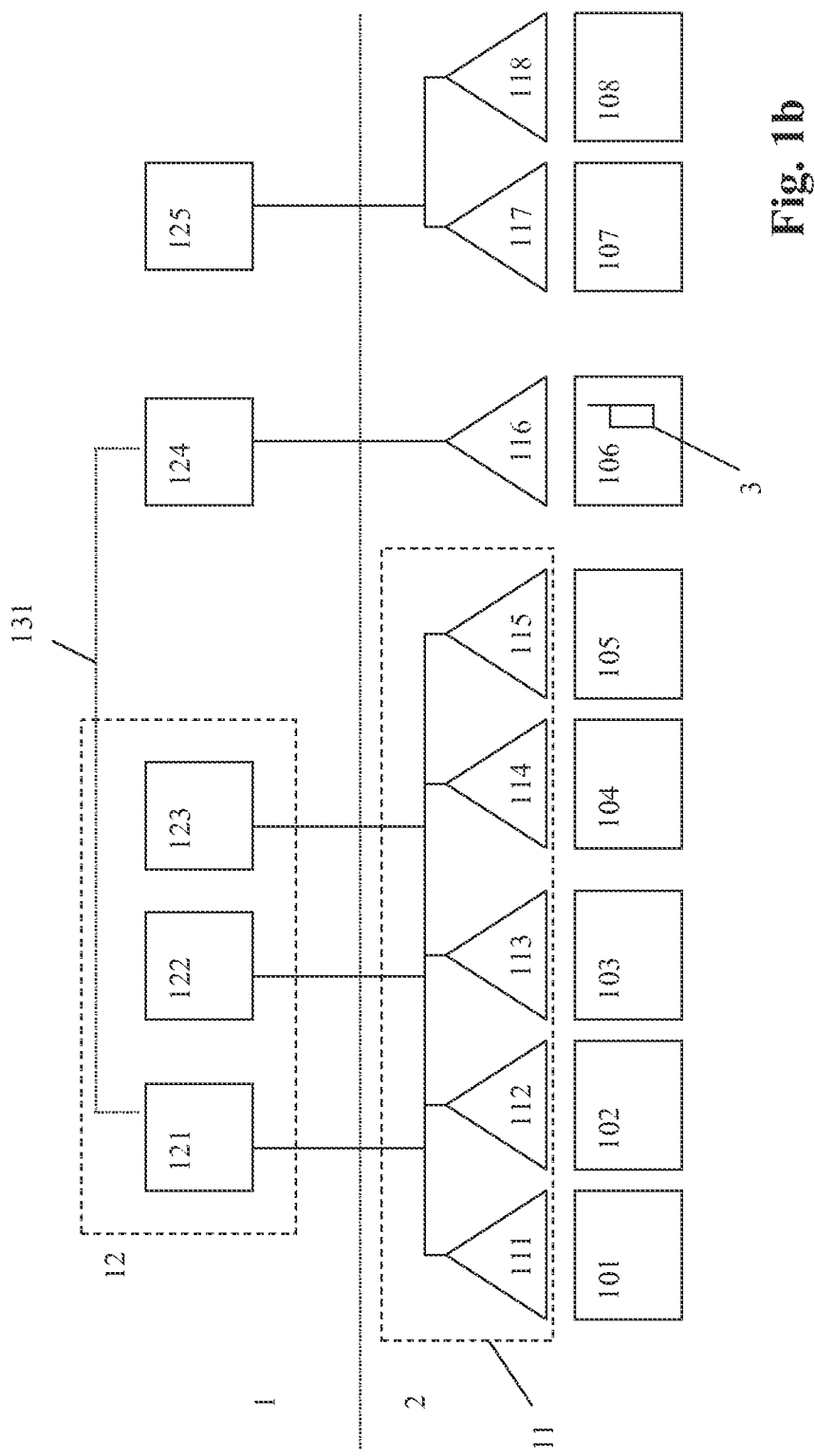

METHOD OF CONTROLLING A COMMUNICATION CONTROL ENTITY

RELATED APPLICATIONS

This application is a continuation of U.S. application Ser. No. 10/595,140, filed Mar. 3, 2006, which is a 371 of International Application PCT/EP2003/009816, filed Sep. 4, 2003, the disclosures of which is fully incorporated herein by reference.

FIELD OF THE INVENTION

The present application is directed towards a method of controlling a communication control entity and to a corresponding communication control entity that is a part of a pool of communication control entities in a mobile communication network. The pool of communication control entities is associated with a group of access control entities, where each communication control entity of the pool can communicate with each access control entity of the group.

BACKGROUND OF THE INVENTION

In the field of mobile communications, it is known to provide a network architecture that is schematically shown in FIG. 1a. A mobile communication network may be divided into a communication control part and an access part. The communication control part 1 is arranged to manage call communications to and from mobile communication devices, such as the schematically indicated mobile telephone 3. The access part 2 is arranged to manage the access of mobile communication devices to the communication control part 1. As an example, in mobile communication networks operating according to the global system of mobile communication (GSM), the communication control part 1 is referred to as the network and switching sub-system (NSS), and the access part 2 is referred to as the base station sub-system (BSS). Generally, the access part 2 may also be called an access network, and the communication control part 1 may be called a control network.

The communication control part 1 comprises a plurality of communication control entities, which are referred to as 121-125 in FIG. 1a. Furthermore, the access part 2 comprises a plurality of access control entities referred to as 111-118. Each access control entity 111-118 is respectively associated with a service realm 101-108. A service realm is a physical and/or logical area in which service is provided to mobile communication devices. As such, a service realm can be a location area (LA), a cell, a routing area (RA) or anything similar. As an example, in a GSM network, the network control entities 121-125 can be mobile switching centers (MSC), and the access control entities 111-118 can be base station controllers (BSC). In the context of a mobile communication network e.g. operating in accordance with the general packet radio service (GPRS), the communication control entities 121-125 can be GPRS service nodes (GSN) and the access control entities 111-118 can be radio network controllers (RNC).

It may be remarked that the term "entity" as used in the present specification and claims describes a logical unit for fulfilling a given function, where said logical unit may be present in a single physical unit (such as a network server) or spread out over several physical locations, and may consist of hardware, software or any suitable combination of hardware and software.

In the general architecture shown in FIG. 1a, each of the access control entities 111-118 is connected to one or more communication control entities 121-125. Thereby, each communication control entity 121-125 is enabled to communicate with mobile communication devices in the service realm of a connected access control entity 111-118.

In the example of FIG. 1a, the mobile telephone 3 is in service realm 101, which belongs to access control entity 111, which in turn is connected e.g. with communication control entity 121 via connection 130. In this way, the access control entity 111 lets the mobile telephone 3 access the communication control part 1, more specifically the communication control entity 121, which in turn can fulfil its functions of controlling the establishment, maintenance and termination of communications originating at the mobile telephone 3 and/or directed towards the mobile telephone 3.

It is furthermore known to arrange a mobile communication network of the type shown in FIG. 1a in such a way that the communication control part 1 is arranged to perform a control process such that during the duration of a call communication to a given mobile communication device, one primary communication control entity stays in control of said call communication and communicates with a mobile communication device of which a call communication is being controlled either via an access control entity connected to the primary communication control entity, or via a secondary communication control entity and an access control entity connected to the secondary communication control entity. In this way the secondary communication control entity acts as a relay between the mobile communication device being controlled and the primary communication control.

This will briefly be explained by comparing FIGS. 1a and 1b. In FIG. 1a, a situation is assumed in which the call communication by mobile telephone 3 is being controlled by communication control entity 121. Communication control entity 121 acts as a primary communication control entity. As an example, the system can be arranged in such a way that the first communication control entity that handles the establishment of a call communication from or to a mobile communication device is selected as the primary communication control entity for the entire duration of the call communication being established. Naturally, other methods of selecting a primary communication control entity are possible.

FIG. 1b shows an example where mobile telephone 3 has moved to service realm 106, which is associated with access control entity 116. Access control entity 116 is connected to communication control entity 124 via a connection 131 provided by the control part 1. However, due to the fact that communication control entity 121 is the primary communication control entity, it still performs the call control, and uses communication control entity 124 as a relay to the mobile communication device in service realm 106. A control mechanism of this type is e.g. known from GSM, in which case the primary communication control entity 121 is referred to as an anchor MSC, and the secondary communication control entity 124 is referred to as a relay MSC.

In order to allow for the mobility of mobile communication devices between different service realms, the communication control part 1 is arranged to be able to conduct a so-called handover procedure between different communication control entities. During an ongoing call communication, the primary call control entity (121 in the above-mentioned example) also controls the handover from one secondary communication control entity to another.

For example, if the mobile telephone 3 shown in FIG. 1b moves from service realm 106 towards service realm 107, a given handover triggering process will be started once it is determined that service should be provided by service realm 107 in place of service realm 106. In this event, a request will be sent to the primary communication control entity 121 from the secondary communication control entity 124 or the corresponding mobile communication device in service realm 106, where said request identifies the new communication control entity 125 as a destination. Subsequently, the primary communication control entity 121 establishes a communication with the new secondary communication control entity 125, in order to then use this new secondary communication control entity as a relay towards the communication device in service realm 107.

It is furthermore known to arrange a communication network having the architecture shown in FIGS. 1a and 1b in such a way that certain access control entities are grouped together, and certain communication control entities are pooled together, where the group of access control entities and the pool of communication control entities are associated in such a way that each communication control entity in the pool can communicate with each access control entity in the group. This is shown in FIGS. 1a and 1b, where reference numeral 12 refers to a pool of communication control entities 121-123, and reference numeral 11 refers to a group of access control entities 111-115.

As indicated in FIGS. 1a and 1b, a connection mechanism 130 is provided, such that each of the communication control entities 121-123 of pool 12 can communicate with each access control entity 111-115 of group 11. The purpose of such pools and groups is to allow that as long as a mobile communication device moves among the service realms 101-105 associated with the access control entities 111-115 of group 11, no handover procedure is conducted between any of the communication control entities of the pool 12. Such pools and groups are e.g. known in the control of service realms having a high traffic load but small physical extension, such as micro-cells in metropolitan areas.

OBJECT OF THE INVENTION

It is the object of the invention to provide an improved method of controlling a communication control entity, and an improved communication control entity for a mobile communication network having the above-described architecture.

SUMMARY OF THE INVENTION

In accordance with an embodiment, a method of controlling a communication control entity in a communication control part of a mobile communication network that comprises said communication control part and an access part is provided. The communication control part is arranged to manage call communications from and to mobile communication devices and the access part is arranged to manage the access of the mobile communication devices to the communication control part. The communication control part comprises a plurality of communication control entities and the access part comprises a plurality of access control entities. Each access control entity may be associated with a service realm in which it can provide access for a mobile communication device that is within this service realm. Each access control entity is connected to one or more communication control entities for enabling each connected communication control entity to communicate with a mobile communication device in the service realm of the access control entity. The communication control part is arranged to perform a control process such that during the duration of a call communication of a mobile communication device, one primary communication control entity stays in control of the call communication, and communicates with a mobile communication device of which a call communication is being controlled, either via an access control entity connected to the primary communication control entity or via a secondary communication control entity and an access control entity connected to the secondary communication control entity. The secondary communication control entity acts as a relay between the mobile communication device and the primary communication control entity. The communication control part is furthermore arranged to be able to conduct a handover procedure between different of communication control entities for handling situations in which a moving mobile communication device moves from one service realm to another during an ongoing call communication of a moving mobile communication device by adding or removing secondary communication control entities from the control process of an ongoing call communication. The handover from one secondary communication control entity to another is controlled by the primary communication control entity. The mobile communication network is furthermore arranged such that a predetermined number of access control entities form a group, each access control entity of said group being connected to a plurality of communication control entities that form a pool. Thereby, as long as a given mobile communication device moves among service realms associated with the access control entities of the group, no handover procedure is conducted between any communication control entities of the pool.

In the method of the invention, the communication control entity acts as primary communication entity for a call communication. When receiving a handover request for removing a first secondary communication control entity from the control process and adding a second secondary communication control entity, the primary communication control entity determines whether the second secondary communication control entity belongs to the pool, and if the second secondary communication control entity belongs to the pool (12), the requested second secondary communication control entity is not added to the control procedure, i.e. the request for adding it is rejected. Instead, the primary communication control entity communicates with the mobile communication device of which the given call communication is being controlled via an access control entity connected to the primary communication control entity.

In accordance with another embodiment, a communication control entity for a communication control part of a mobile communication network that comprises said communication control part and an access part is provided. The communication control entity comprises a processor, which, when the communication control entity is acting as a primary communication control entity and when a handover request for removing a first secondary communication control entity from the control process and adding a second secondary communication control entity is received, is arranged to determine whether the second secondary communication control entity belongs to said pool or not. If the requested second secondary communication control entity belongs to the pool, the processor controls the communication control entity to directly communicate with the mobile communication device of which said given call communication is being controlled via an access control entity connected to said communication control entity. The processor can e.g. be arranged to provide these capabilities by appropriate software elements, i.e. a software element for determining whether the second secondary communication control entity belongs to said pool or not, and a software element for controlling the communication control entity to directly communicate with the mobile communication device when the second secondary communication control entity belongs to the pool.

Therefore, in accordance with the present invention, a communication control entity that belongs to a pool, such as the pool 12 in FIG. 1, and which acts as a primary (or anchor) communication entity for a given call communication, is arranged to perform a determination step when receiving a request for removing a first secondary (or relay) communication control entity from the control process and adding a second secondary (or relay) communication control entity to the process, i.e. when requested to conduct a handover from a first to a second secondary communication control entity. If the second secondary communication control entity belongs to the pool, then this desired second secondary communication control is not added to the control procedure, much rather the primary communication control entity takes control by communicating with the mobile communication device of which the call communication is being controlled, directly via an access control entity connected to the primary communication control entity.

BRIEF DESCRIPTION OF THE DRAWINGS

FIG. 1*a* shows a schematic representation of a network architecture to which the present invention can be applied, where a mobile communication device is in a first service realm, FIG. 1*b* shows a schematic representation of the network architecture of FIG. 1*a*, where the mobile communication device is in a second service realm.

DETAILED DESCRIPTION OF EMBODIMENTS

Figure 2:
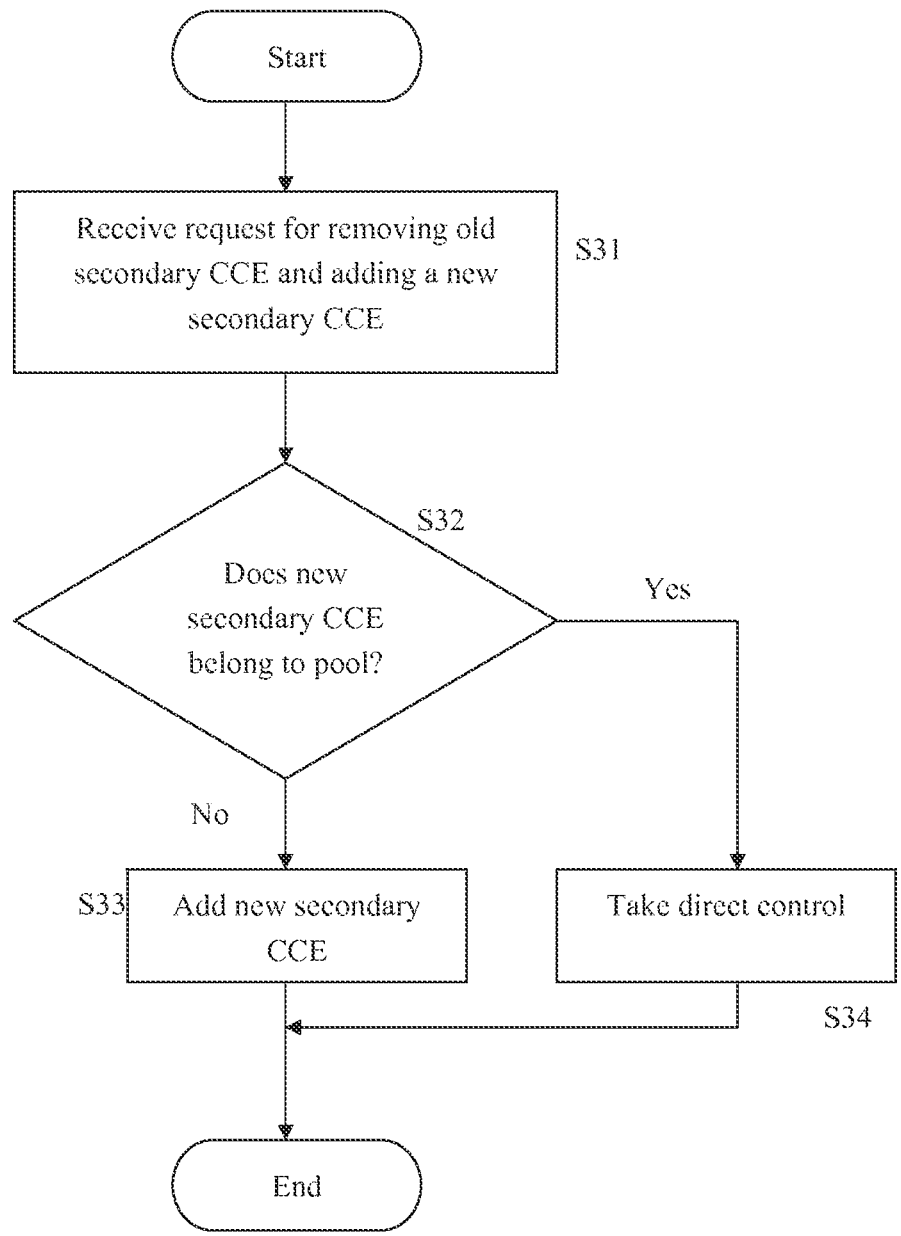
FIG. 2 shows a flow chart of a basic embodiment of the invention.

An embodiment of the present invention will now be described with reference to the flow chart of FIG. 2 and the entities already described in connection with FIGS. 1*a* and 1*b*. As already mentioned in connection with FIGS. 1*a* and 1*b*, the described entities can operate in accordance with GSM, GPRS or any other telecommunication standard such as e.g. UMTS (Universal Mobile Telephony System). The various communication control entities 121-124 can be of the same type (e.g. can all be MSCs of a GSM system), or can be of different type, e.g. some can be GSM MSCs and others can be GPRS SGNs or the corresponding UMTS entities.

Naturally, the number of elements shown in FIGS. 1*a* and 1*b* is only an example, and the present invention can be applied to mobile communication networks having a larger or smaller number of communication control entities and access control entities.

In accordance with the invention, one or more of the communication control entities 121-123 contained in pool 12 is arranged to operate as shown in FIG. 2. More specifically, the communication control entities are arranged to operate in accordance with the method of FIG. 2 when acting as a primary communication control entity, e.g. when acting as an anchor MSC.

Reference will now also be made to FIG. 1*b*, where it is assumed that entity 121 is the primary communication control entity and entity 124 the secondary communication control entity. Consequently, entity 121 communicates with entity 124 via an appropriate connection 131 (provided by the communication control part 1). If the mobile telephone 3, which is an example of a mobile communication device, moves out of service realm 106, then an appropriate handover request will be sent to entity 121 via entity 124. In this request, the secondary communication control entity 124 will indicate a new communication control entity that is to be involved as a secondary communication control entity. Step S31 in FIG. 2 indicates the receipt of such a request by the primary call control entity 121.

Subsequent to step S31, the present invention proposes to implement a decision step S32, in which the primary communication control entity determines whether the new secondary call control entity identified in the request belongs to pool 12 or not. If it does not belong to the pool, then the procedure goes to step S33, in which the requested new secondary call control entity is employed in place of the old one making the request. For example, if secondary call control entity 124 requests a handover to call control entity 125, then the primary call control entity 121 determines in step S32 that call control entity 125 is not a member of pool 12, and consequently performs the regular handoff procedure in order to use new secondary communication control entity 125 and to subsequently release old call communication control entity 124.

On the other hand, if step S32 determines that the requested new secondary call control entity is a member of pool 12, then the primary communication control entity 121 does not switch to the requested new secondary call control entity, but much rather takes direct control, as indicated in step S34. This means that the primary communication control entity directly communicates with the access part 2, without using another communication control entity as a relay.

For example, it is possible that when the mobile telephone 3 moves into service realm 105, the secondary call control entity 124 will identify service realm 105 as associated with communication control entity 123. Being outside of pool 12, communication control entity 124 will not be aware of this pool 12. The information providing an association between the service realm 105 and communication control entity 123 can be derived e.g. from general network information available to communication control entity 124.

Therefore, the secondary communication control 124 sends a handover request to primary communication control entity 121, said request identifying call control entity 123 as a desired new secondary communication entity. In accordance with the method of the invention, the determination of step S32 will let primary communication control entity 121 determine that the desired new secondary communication control entity 123 is a member of pool 12. As a consequence, the primary communication control entity 121 will not add entity 123 to the control procedure, but much rather directly establish communication with the access control entity 115 that is associated with the service realm 105 into which the mobile telephone 3 has moved. Thereby, the concept of the present invention avoids an unnecessary handoff procedure in the pool 12, which reduces overall traffic in the network and thereby decreases the network load.

The determination of step S32 can be done in any suitable or desirable way. For example, each member of pool 12 can be arranged to keep a list of identifiers of communication control entities belonging to the pool 12. Alternatively or in addition, each communication control entity can also keep a list of identifiers of access control entities/service realms belonging to the group 11 associated with the pool 12. In this way, each communication control entity 121-123 of pool 12, when acting as a primary communication control entity, can determine whether a request identifies a communication control entity of pool 12 directly (in terms of an identifier for call control entities) or indirectly (in terms of an identifier for access control entities/service realms).

The method of the present invention can also be embodied in the form of a computer program product (e.g. a computer program or a data carrier storing such a computer program) for performing the method of FIG. 2 when executed on a communication control entity such as entity 121 described above.

The present invention can furthermore be embodied by a device acting as a communication control entity, where such a device is arranged to perform the method of FIG. 2, which can be accomplished by designated hardware, software or any suitable combination of hardware and software. Preferably, this is achieved by running software that implements the method of the invention on a network node of the mobile communication network.

Although the previous description refers to specific embodiments, these only serve to provide a thorough understanding of the invention, and the scope of the invention is defined by the appended claims.

The invention claimed is:

1. A method of controlling a communication control entity in a communication control part of a mobile communication network that comprises a communication control part and an access part, the communication control entity acting as a primary communication entity for a call communication and belonging to a pool of communication control entities among which no handover procedure is conducted as long as a mobile communication device moves among service realms associated with a predetermined number of access control entities that are connected to the pool, the method comprising the steps:
   establishing the communication control entity as the primary communication control entity with the mobile communication device via a first secondary communication control entity acting as a relay between the mobile communication device and the primary communication control entity:
   receiving, by the communication control entity, a handover request for removing the first secondary communication control entity from a control process for controlling the call communication and adding a second secondary communication control entity;
   determining, by the communication control entity, whether the second secondary communication control entity belongs to the pool; and
   responsive to the second secondary communication control entity belonging to the pool, establishing direct communication with the communication control entity and the mobile communication device in response to the handover request.

2. The method of claim 1, wherein the primary communication control entity determines whether the second secondary communication control entity belongs to the pool by determining an identifier of the second secondary communication control entity from the handover request and comparing the identifier with a list of identifiers of communication control entities belonging to the pool.

3. The method of claim 1, wherein the primary communication control entity determines whether the second secondary communication control entity belongs to the pool by determining an identifier of an access control entity connected to the second secondary communication control entity from the handover request and comparing the identifier with a list of identifiers of access control entities belonging to the predetermined number of access control entities.

4. The method of claim 1, further comprising, responsive to the second secondary communication control entity not belonging to the pool, adding the second secondary communication control entity to use as a relay to the communication control entity.

5. A communication control entity for a communication control part of a mobile communication network that comprises a communication control part and an access part the communication control entity belonging to a pool of communication control entities among which no handover procedure is conducted as long as a mobile communication device moves among service realms associated with a predetermined number of access control entities that are connected to the pool, and being arranged to act as a primary communication entity for a given call communication, wherein the communication control entity comprises:
   a processor arranged to:
      establish the communication control entity as the primary communication entity with the mobile communication device via a first secondary communication control entity acting as a relay between the mobile communication device and the primary communication control entity; and
      when the communication control entity is acting as the primary communication control entity and when a handover request for removing the first secondary communication control entity from the control process and adding a second secondary communication control entity is received, the processor is further arranged to:
         determine whether the second secondary communication control entity belongs to the pool, and
         responsive to the second secondary communication control entity belonging to the pool, communicating directly by the communication control entity with the mobile communication device of which the given call communication is being controlled via an access control entity connected to the communication control entity in response to the handover request.

6. The communication control entity of claim 5 wherein when the communication control entity is acting as the primary communication control entity and when a handover request for removing the first secondary communication control entity from the control process and adding a second secondary communication control entity is received, the processor is further arranged to: responsive to the second secondary communication control entity not belonging to the pool, adding the second secondary communication control entity to use as a relay to the communication control entity.

7. A system for controlling a first communication control entity in a mobile communication network, the system comprising:
   a communication control part having a pool of communication control entities;
   a mobile communication device moving among service realms associated with a predetermined number of access control entities that connect to the pool;
   the first communication control entity of the pool of communication control entities that controls a call by the mobile communication device in the mobile communication network established as a primary communication entity with the mobile communication device via a first secondary communication control entity acting as a relay between the mobile communication device and the primary communication control entity, wherein the first communication control entity, upon receiving a handover request for removing the first secondary communication control entity from a control process of the call and adding a second secondary communication control entity, performs:

determining whether the second secondary communication entity belongs to the pool; and responsive to the second secondary communication control entity belonging to the pool, establish direct communication with the first communication control entity and the mobile communication device in response to the handover request.

8. The system of claim 7 wherein the first communication control entity, upon receiving a handover request for removing the first secondary communication control entity from a control process of the call and adding a second secondary communication control entity, further performs: responsive to the second secondary communication control entity not belonging to the pool, adding the second secondary communication control entity to use as a relay to the communication control entity.

* * * * *